E. M. LOGAN & C. E. McNAUGHTON.
TURN TABLE AND POWER TRANSMISSION MECHANISM FOR MOTOR VEHICLES.
APPLICATION FILED SEPT. 23, 1913.

1,189,708.

Patented July 4, 1916.
2 SHEETS—SHEET 1.

Witnesses:
A. G. Dimond
A. L. McGee

Inventors
Edward M. Logan & Clarence E. McNaughton
by Wilhelm Parker & Hard
Attorneys.

E. M. LOGAN & C. E. McNAUGHTON.
TURN TABLE AND POWER TRANSMISSION MECHANISM FOR MOTOR VEHICLES.
APPLICATION FILED SEPT. 23, 1913.

1,189,708.

Patented July 4, 1916.
2 SHEETS—SHEET 2.

Witnesses:
A. G. Dimond.
A. L. McKee.

Inventors.
Edward M. Logan & Clarence E. McNaughton,
by Wilhelm Parker & Hard
Attorneys.

UNITED STATES PATENT OFFICE.

EDWARD M. LOGAN AND CLARENCE E. McNAUGHTON, OF SONYEA, NEW YORK.

TURN-TABLE AND POWER-TRANSMISSION MECHANISM FOR MOTOR-VEHICLES.

1,189,708.  Specification of Letters Patent.  Patented July 4, 1916.

Application filed September 23, 1913. Serial No. 791,271.

*To all whom it may concern:*

Be it known that we, EDWARD M. LOGAN and CLARENCE E. McNAUGHTON, citizens of the United States, residing at Sonyea, in the county of Livingston and State of New York, have invented a new and useful Improvement in Turn-Tables and Power-Transmission Mechanisms for Motor-Vehicles, of which the following is a specification.

This invention relates to turntables and power transmission mechanism which are intended for use with motor propelled vehicles.

The object of this invention is to produce a practical and desirable turntable for motor propelled vehicles, which is of inexpensive and simple construction and is operated by power supplied by the vehicle which is being turned, and further to provide means whereby the motor vehicle can also be utilized for operating other machinery.

Figure 1:
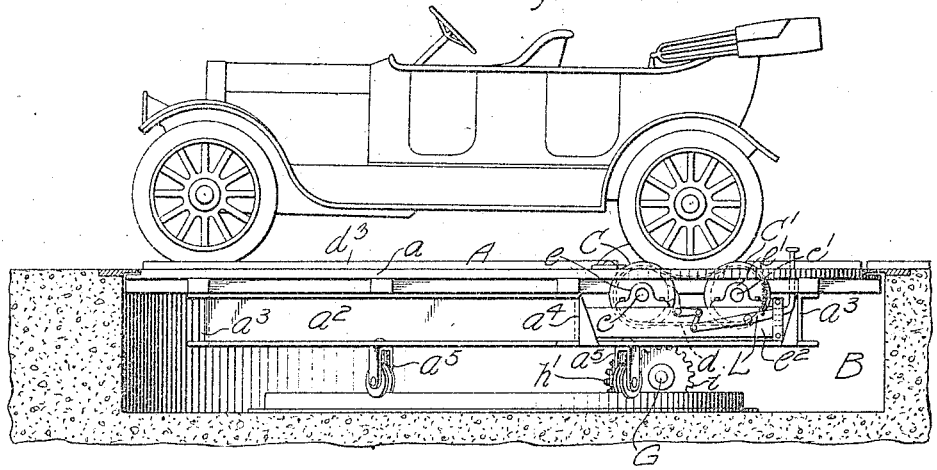
Figure 2:
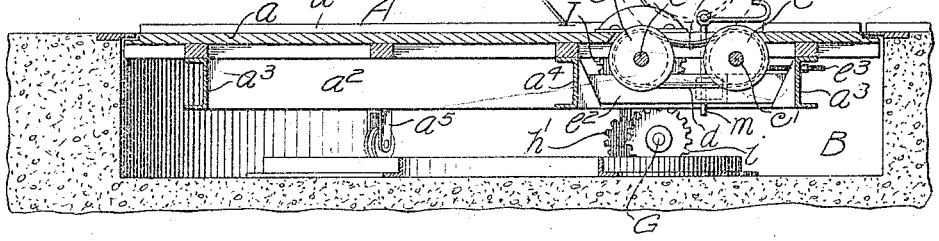
Figure 3:
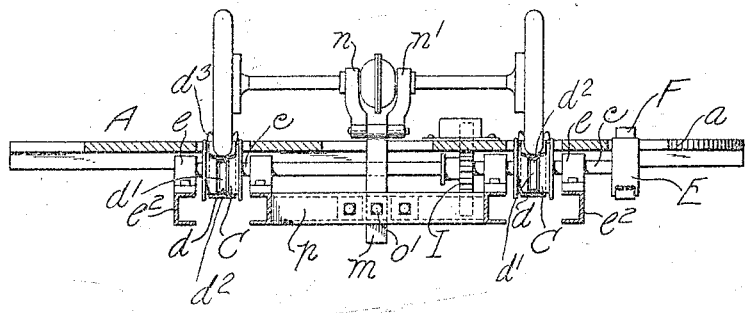
Figure 4:
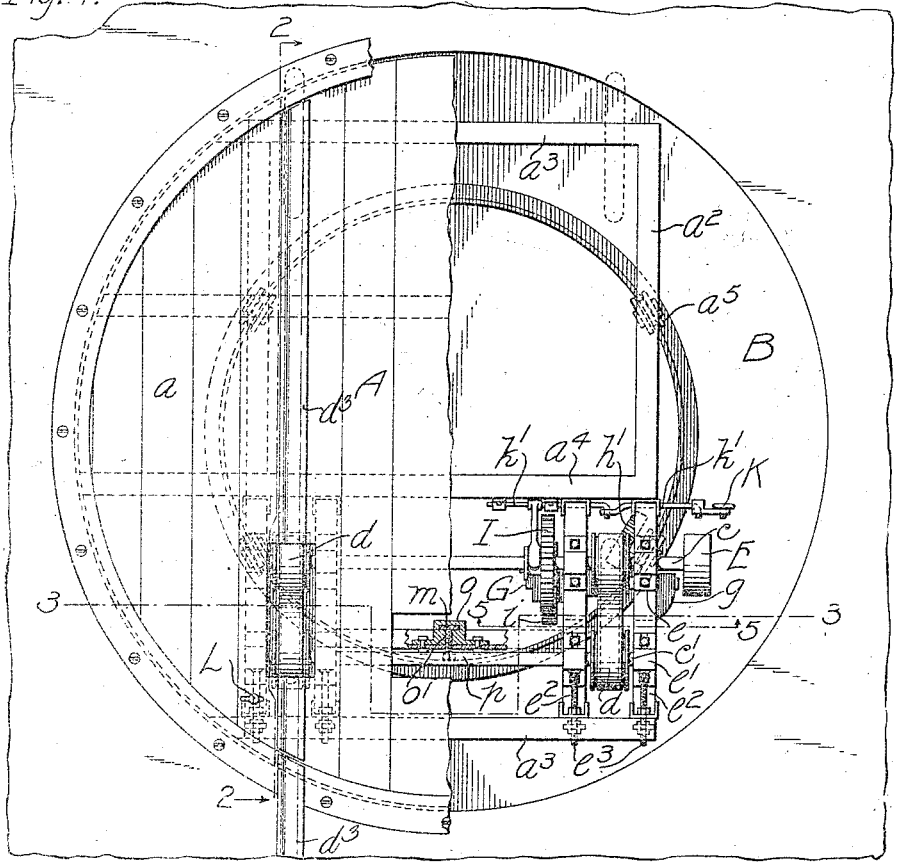
Figure 5:
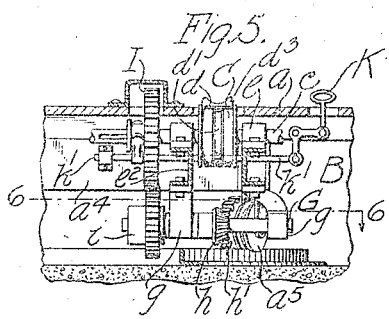
Figure 6:
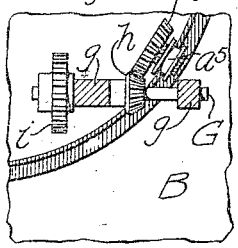
Figure 7:
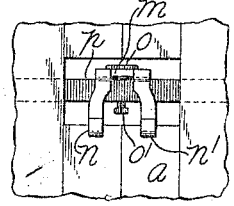
Figure 8:
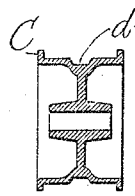

In the accompanying drawings: Figure 1 is a sectional side elevation of a turntable embodying the invention showing a motor vehicle in place thereon. Fig. 2 is a sectional side elevation on line 2—2, Fig. 4. Fig. 3 is a fragmentary sectional side elevation on line 3—3, Fig. 4. Fig. 4 is a fragmentary plan view of the turntable. Fig. 5 is a fragmentary sectional elevation on line 5—5, Fig. 4. Fig. 6 is a fragmentary plan view on line 6—6, Fig. 5. Fig. 7 is a fragmentary plan view of an attaching means for the vehicle chassis. Fig. 8 is a sectional view of one of the pulleys.

Like reference characters refer to like parts in the several figures.

The turntable A is preferably arranged to turn in a suitable pit B. This turntable may be of any suitable construction; for instance, as shown it comprises a circular top or platform $a$ and a supporting rectangular frame composed of parallel longitudinal side members $a^2$ and transverse end and intermediate members $a^3$ $a^4$. To this frame are secured suitable wheels $a^5$ which rest and are adapted to travel on a circular track arranged in the pit for rotatably supporting the turntable.

C C' represent pulleys which are secured on parallel shafts $c$ $c'$ suitably journaled on the supporting frame of the turntable beneath the platform $a$ and which are adapted to support the driving wheels of a motor vehicle, as shown in Figs. 1 and 3 and be driven thereby. Each pair of pulleys C C' is connected by a belt $d$ so as to provide a greater frictional surface for the driving wheels of the vehicle and insure better traction.

Motor vehicles with which the present apparatus is intended to be used are ordinarily equipped with pneumatic tires having treads of substantially semicircular cross section, and when the driving wheels of such vehicles are placed upon the belts $d$ as shown in Fig. 1 the weight of the vehicle together with the shape of the tire will cause the belts to conform more or less to the face of the tire, or assume a concaved or trough shape. By reason of this the machine belts of the ordinary kind will gradually creep off the pulleys. To prevent this creeping of the belts each pulley C C' is preferably provided with a centrally arranged peripheral groove $d'$ adapted to receive a longitudinal projecting rib $d^2$ on the inner face of the belt $d$. The curved tires bearing on the middle portions of the belts hold these ribs $d^2$ in the grooves of the pulleys and thus prevent the belts from shifting on the pulleys, notwithstanding the lifting of the edge of the belts. The pulleys are also preferably provided with side flanges between which the belts are confined. The platform $a$ is preferably provided with tracks or rails $d^3$ of any suitable kind for guiding the driving wheels onto the belts $d$ when the motor vehicle is run onto the turntable.

As shown, the pulley shafts $c$ $c'$ are journaled in bearings $e$ and $e'$ which are secured on the side members $a^2$ of the supporting frame and on longitudinal frame members $e^2$ located between the side members. The bearings $e'$ of one of the shafts $c$ $c'$ are adjustable on the frame toward and from the other shaft so as to tighten or loosen the belts $d$ or to increase or decrease the distance between the pulleys to accommodate driving wheels of different sizes. This adjustment is effected by means of adjusting screws $e^3$ connecting the bearings $e'$ to the end of the supporting frame.

In Fig. 1 an automobile is shown in place on the turn-table with its driving wheels resting on the belts connecting the pulleys C C'. If the drive wheels are driven by the vehicle motor with the vehicle in this position, the pulleys and the shafts $c$ $c'$ to which they are connected will be driven by the frictional contact between the belts and the drive wheels of the automobile. The power thus obtained may be used for operating various kinds of machinery which may be connected to one of the shafts $c$ $c'$ by means of a pulley E and belt F, or this power may be used to turn the turntable with the motor vehicle upon it. For this purpose, in the construction shown, an auxiliary shaft G is journaled in suitable bearings $g$ depending from the supporting frame and is connected by a beveled pinion $h$ and gear wheel $h'$ to the shaft of one of the supporting wheels $a^5$ for the turntable. The shaft G is driven by a pinion $i$ and a gear wheel I connecting it to the shaft $c$. The gear wheel I is splined on the shaft $c$ so that it can be moved endwise to place it into and out of mesh with the pinion $i$. By shifting the gear wheel I into mesh with the pinion $i$ the shaft G can be driven for moving the turntable to turn the automobile to face in any desired direction, while by throwing the gear wheel I out of mesh with the pinion $i$ the motion of the turntable can be arrested and the mechanism can be utilized for transmitting power for any other desired purpose. The gear wheel I can be shifted by any suitable means, a lever K being shown for this purpose which is located in a convenient position on the turntable and is connected by a rod $k'$ to the gear wheel I. Any other known or suitable means can be employed instead of the shifting gear for connecting the shaft G to and disconnecting it from the drive shaft $c$.

L represents a brake adapted to prevent the undesired rotation of the pulleys C C' and to hold the pulleys so as to provide a rigid traction surface to the driving wheels of the motor vehicle while the vehicle is being placed on or removed from the transmission mechanism. A brake or stop device of any suitable kind may be employed. That shown is pivoted on the supporting frame and has a shoe adapted to engage one of the pulleys C and is connected to an operating lever which extends up through a hole in the turntable.

A suitable device, such as is shown in Fig. 3, is preferably provided for holding the vehicle with the driving wheels in place upon the belts. As shown, this device consists of a bar $m$ to which are pivoted hooks $n$ $n'$. The hooks $n$ $n'$ are adapted to be hooked over the rear axle housing of the vehicle and the bar $m$ is adjustably secured in a clamp $o$ secured to the frame member $p$. When the hooks $n$ $n'$ are in the desired position the bolt $o'$ can be tightened so as to secure the bar $m$ and thus securely hold the vehicle in place.

We claim as our invention:

1. A turntable for automobiles, means for rotatably supporting the same, pulleys mounted on said turntable and adapted to support the drive wheels of an automobile resting on the turntable, a shaft driven by said pulleys and provided with means for transmitting power therefrom to a device to be driven other than the turntable, drive means for rotating said turntable, comprising gearing interposed between said shaft and the turntable, and means for connecting said gearing to and disconnecting it from said shaft at will while the drive wheels of the automobile rest on said pulleys, substantially as set forth.

2. A turntable for automobiles, means for rotatably supporting the same, pulleys mounted on said turntable and adapted to support the drive wheels of an automobile resting on the turntable, a power transmission means driven by said pulleys for transmitting power to a driven device other than the turntable, drive means for rotating said turntable comprising gearing interposed between said power transmission means and the turntable, and means for coupling and uncoupling said gears to and from said transmission means at will while the drive wheels of the automobile rest on said pulleys, substantially as set forth.

3. A turntable for automobiles, supporting wheels for said turntable arranged to travel on a circular track, a pulley mounted on said turntable and adapted to be driven by the drive wheel of an automobile resting on the turntable, drive means interposed between one of said supporting wheels and said pulley, and means for operatively connecting said drive means to said pulley and to said wheel for driving the latter to turn said turntable, substantially as set forth.

4. The combination of a horizontal platform supported substantially in the plane of a floor, pulleys mounted substantially below the surface of said platform and adapted to support the driving wheels of a motor vehicle resting on said platform, a shaft driven by said pulleys, a pulley on said shaft below said platform, and a power transmitting belt extending from said pulley through an opening in said platform, substantially as set forth.

5. The combination of a horizontal platform supported substantially in the plane of a floor, pulleys mounted substantially below the surface of said platform and adapted to support the driving wheels of a motor vehicle resting on said platform, a shaft driven by said pulleys, a pulley on said shaft below said platform, a power transmitting belt extending from said pulley through an opening in said platform, and a brake arranged below said platform and adapted to engage one of said pulleys and having an operating part accessible from above said platform, substantially as set forth.

6. The combination of pulleys arranged to support the driving wheel of a motor vehicle, a belt connecting said pulleys and on which the wheel of the motor vehicle rests, said belt having a longitudinal projecting rib which enters peripheral grooves in the faces of said pulleys, and means operatively connected to one of said pulleys and driven thereby, substantially as set forth.

Witness our hands this 20th day of September, 1913.

EDWARD M. LOGAN.
CLARENCE E. McNAUGHTON.

Witnesses:
H. R. PORTER,
CLARENCE J. O'CONNOR.